United States Patent
Umansky et al.

(10) Patent No.: US 12,093,242 B2
(45) Date of Patent: *Sep. 17, 2024

(54) ONLINE DETERMINATION OF RESULT SET SENSITIVITY

(71) Applicant: Microsoft Technology Licensing, LLC, Redmond, WA (US)

(72) Inventors: Alex Umansky, Akko (IL); David Edward Brookler, Maalot (IL); Gilad Mittelman, Kiryat Motzkin (IL); Shai Kariv, Zofit (IL); Tomer Levav, Haifa (IL); Tomer Weisberg, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,432

(22) Filed: Jun. 30, 2023

(65) Prior Publication Data

US 2023/0350870 A1  Nov. 2, 2023

Related U.S. Application Data

(63) Continuation of application No. 15/806,293, filed on Nov. 7, 2017, now Pat. No. 11,734,252.

(51) Int. Cl.
| | |
|---|---|
| *G06F 16/23* | (2019.01) |
| *G06F 16/245* | (2019.01) |
| *G06F 16/25* | (2019.01) |
| *G06F 21/62* | (2013.01) |

(52) U.S. Cl.
CPC ........ *G06F 16/2358* (2019.01); *G06F 16/245* (2019.01); *G06F 16/256* (2019.01); *G06F 21/6245* (2013.01)

(58) Field of Classification Search
CPC .. G06F 16/2358; G06F 16/245; G06F 16/256; G06F 21/6245
See application file for complete search history.

(56) References Cited

U.S. PATENT DOCUMENTS

2023/0080686 A1* 3/2023 Gupta ................ G06F 16/3347
726/26

OTHER PUBLICATIONS

Office Action Received for European Application No. 18804470.5, mailed on Oct. 27, 2023, 8 pages.

* cited by examiner

*Primary Examiner* — Mark D Featherstone
*Assistant Examiner* — Kweku William Halm
(74) *Attorney, Agent, or Firm* — Weaver IP L.L.C.

(57) ABSTRACT

A system includes reception of a database query, determination of result set output columns associated with the database query, and determination, for each of the determined result set output columns, of one or more data sources associated with the result set output column. Sensitivity information is determined for each of the one or more data sources based on metadata, and result set sensitivity information is determined based on the determined sensitivity information. A result set is determined based on the database query, and the result set and the result set sensitivity information are transmitted.

20 Claims, 8 Drawing Sheets

Database Design Application — 300

Table Employees — 310

| Col Name | Data Type | Allow Nulls | Default | Info_type | Sensitivity |
|---|---|---|---|---|---|
| EMPLOYEEID | uniqueid | no | | none | none |
| FIRSTNAME | varchar | no | | name | PII |
| MIDDLENAME | varchar | yes | | name | PII |
| LASTNAME | varchar | no | | name | PII |
| SS# | numeric | no | | SSN | Regulated |
| DOB | numeric | no | | Birthdate | Public |
| PASSPORTNO | numeric | no | | Passport | Confidential |

*FIG. 3*

```
         ┌──────────────┬───────────┬──────────┐ ╱─310
         │  EMPLOYEEID  │ FIRSTNAME │ LASTNAME │
         ├──────────────┼───────────┼──────────┤
         │              │           │          │
         ├──────────────┼───────────┼──────────┤
```

Data Analysis Application

Underline = Data cannot be exported  ┌820
Underline and Bold = Data cannot be exported or copied

Employee Data ┌810

| Name | Country | Birthdate | PassportNo |
|---|---|---|---|
| ~~~~~ ~~~~ | USA | ~~~~~~ | ~~~~~~ |
| ~~~~~ ~~~~ | USA | ~~~~~~ | ~~~~~~ |
| ~~~~~ ~~~~ | Canada | ~~~~~~ | ~~~~~~ |
| ~~~~~ ~~~~ | USA | ~~~~~~ | ~~~~~~ |
| ~~~~~ ~~~~ | Israel | ~~~~~~ | ~~~~~~ |
| ~~~~~ ~~~~ | Israel | ~~~~~~ | ~~~~~~ |

*FIG. 8*

ONLINE DETERMINATION OF RESULT SET SENSITIVITY

CROSS-REFERENCE TO RELATED APPLICATION(S)

The present application is a continuation of, and claims priority to, pending U.S. patent application Ser. No. 15/806,293, entitled "ONLINE DETERMINATION OF RESULT SET SENSITIVITY," filed on Nov. 7, 2017, the entirety of which is incorporated by reference herein.

BACKGROUND

A database system may store data related to, for example, a business enterprise, a government entity, and/or individuals. This data may include publicly-known data, such as model numbers and department names, and confidential or regulated data, such as credit card numbers and social security numbers. Different types of data are associated with different sensitivities, which typically indicate the degree to which the data should be protected from unauthorized access and/or disclosure.

Database systems may tag stored data with information indicating the sensitivity of the data. The information may be used to control access to the stored data. For example, a database system may receive a request for stored data from a user operating a client application. In response, the database system identifies information tagged to the stored data and determines whether the user is authorized to view data which is tagged with such information. If the user is authorized, the database system provides the stored data to the client application.

Systems are desired to efficiently handle requests for data associated with disparate sensitivities. Moreover, systems are desired to facilitate processing of a received result set, by a requesting client application and/or other downstream applications, based on sensitivities of the data from which the result set was generated.

BRIEF DESCRIPTION OF THE DRAWINGS

FIG. 3 is an outward view of a user interface to define sensitivity-related column attributes according to some embodiments.

FIG. 8 is a user interface presenting a result set based on result set sensitivity information according to some embodiments.

DETAILED DESCRIPTION

The following description is provided to enable any person in the art to make and use the described embodiments. Various modifications, however, will remain readily apparent to those in the art.

Generally, some embodiments provide efficient determination of result set sensitivity information based on sensitivities of the data used to generate the result set. The result set sensitivity information may be determined in real-time during generation of the result set and provided to a requesting client application along with the result set. By providing the sensitivity of the result set to the requesting client application, some embodiments allow the client application to process the returned result set based on the sensitivity (e.g., to apply specific security measures, to generate a visualization of the result set, to control editing or export of the result set).

A technical problem addressed by some embodiments is the inability to determine and provide the sensitivity of a received result set which is based on disparate data sources, each of which may be associated with disparate sensitivity information. Some embodiments provide a technical solution of identifying table columns which underlie a query result set based on analysis of the query and database schema, identifying the sensitivity of the table columns via database metadata, determining result set sensitivity information based on the identified sensitivities, and efficiently providing result set sensitivity information to a client application within result set metadata.

Figure 1:
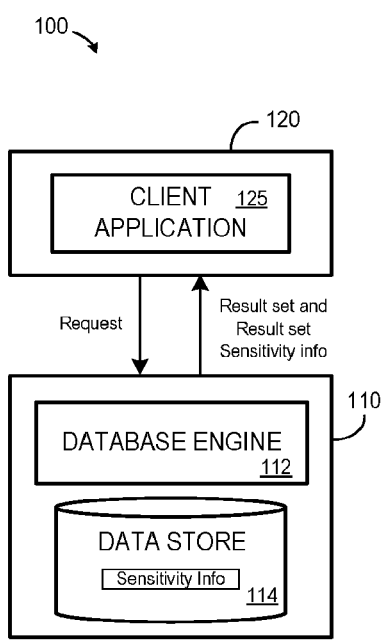
FIG. 1 is a block diagram of a system architecture to determine and provide result set sensitivity information according to some embodiments.

FIG. 1 is a block diagram of system 100 according to some embodiments. Embodiments are not limited to the FIG. 1 system. System 100 includes data server 110 and client system 120.

According to some embodiments, client system 120 executes client application 125 to request data from data server 110. Data server 110 executes database engine 112 to receive the request and retrieve data from data store 114 based on the request. Database engine 112 generates a result set based on the received data.

According to some embodiments which will be described in detail below, database engine 112 also determines result set sensitivity information based on sensitivity information associated with the data sources from which the result set is generated. Database engine 112 determines the result set sensitivity information in response to the received request and contemporaneously with the determination of the result set. The result set is returned to client application 125 along with metadata indicating the result set sensitivity information. Client application 125 may therefore account for the sensitivity of the result set during subsequent processing, display and/or transmission of the result set.

Data server 110 may comprise any hardware system to store data and to serve requests for the stored data. Database engine 112 may support any suitable query protocols (e.g., Structured Query Language (SQL)) and may provide other suitable database management functionality. Data store 114 may comprise any one or more data sources storing any type of structured and/or unstructured data. A hardware processing system implementing database engine 112 (e.g., a server blade) may be physically integrated with or separate from a hardware storage system (e.g., a fixed disk array, volatile random access memory) implementing data store 114.

The data sources of data store 114 may comprise database tables interrelated via a database schema defined by metadata which is also stored in data store 114. The metadata may also include sensitivity information associated with one or more of the data sources of data store 114 as will be described below.

Embodiments are not limited to relational databases. A data source according to some embodiments may comprise an unstructured text document or the like. Sensitivity information of an unstructured data source may be embedded within the data source (e.g., a "Confidential" watermark) or defined by external metadata associated with the data source.

Client system 120 may comprise, for example, a desktop computer, a laptop computer, a tablet computer, or a smartphone. Client system 120 may comprise any suitable computing device capable of executing client application 125 to request and receive a result set from data server 110. Client application 120 may comprise a data analysis application which facilitates data visualization and analysis, but embodiments are not limited thereto. According to some embodiments, client application 125 comprises a Web application executed within a Web browser of client system 120.

Figure 2:
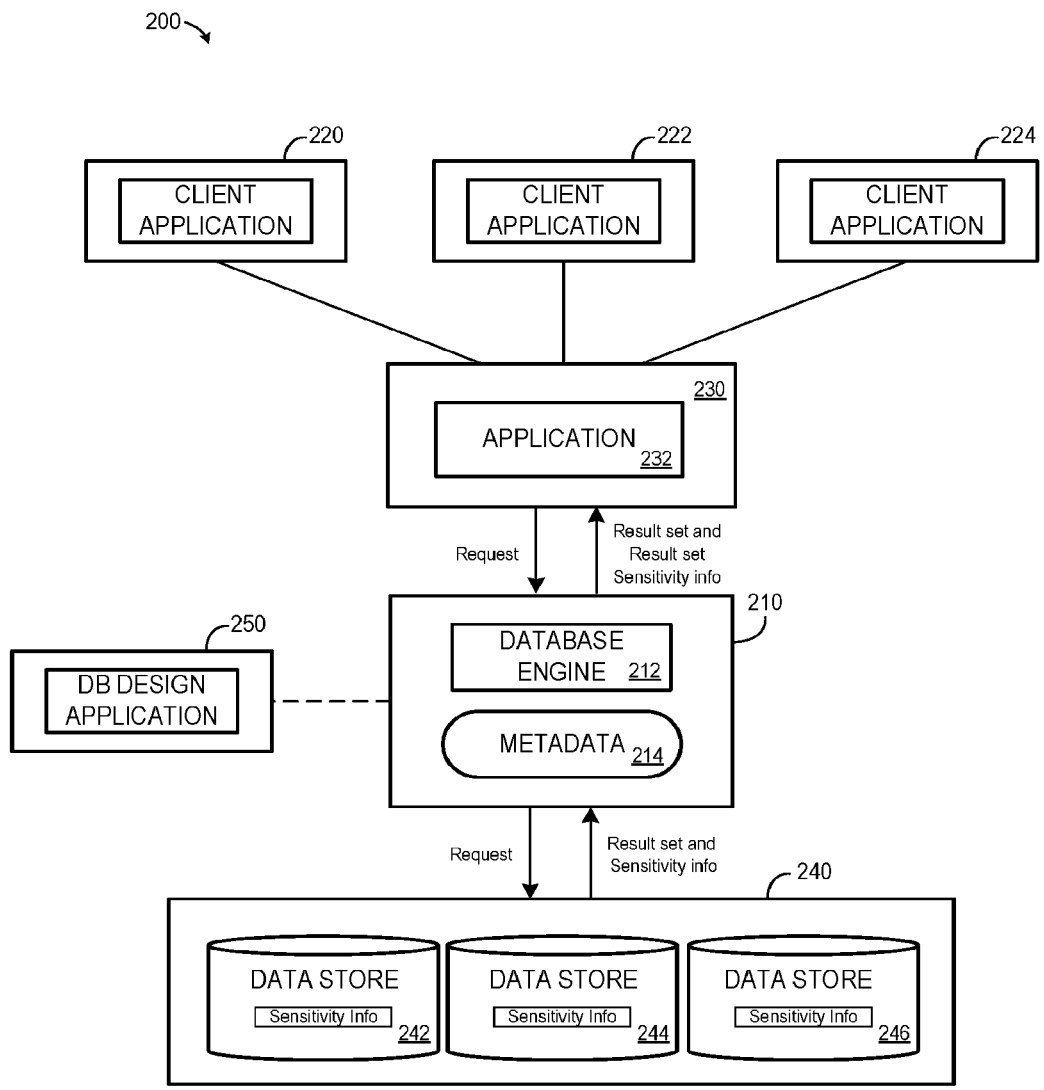
FIG. 2 is a block diagram of a system architecture to determine and provide result set sensitivity information according to some embodiments.

FIG. 2 illustrates system 200 according to some embodiments. System 200 may comprise an implementation of system 100 but is not limited thereto. System 200 comprises data server 210, client systems 220, 222 and 224, application server 230, data storage system 240 and development system 250. Embodiments are not limited to the architecture of system 200. For example, application server 230 and data server 210 may comprise a single database platform according to some embodiments.

According to some embodiments, any of client systems 220, 222 and 224 may execute a respective client application to interact with application 232 executed by application server 230. For example, execution of a client application may cause presentation of a user interface on a display device of a client system. A user may manipulate the user interface, causing the client application to transmit a request based on the manipulation to application 232. Application 232 generates a query (e.g., an SQL script) based on the request and forwards the query to database engine 212 executed by data server 210. In some embodiments, each client application of client systems 220, 222 and 224 interacts directly with data server 210 to provide a query thereto as described with respect to FIG. 1.

During online operation, database engine 212 executes a received query based on stored metadata 214 to generate a result set based on data stored in data storage system 240. Assuming the data comprises relational database tables, metadata 214 may include information specifying the structure and content of the data sources stored in data stores 242, 244 and 246 and any interrelations therebetween. Embodiments are not limited to structured data sources. Metadata 214 may also associate various types of sensitivity information with one or more of the data sources (e.g., table columns) used to generate the result set. Database engine 212 may determine result set sensitivity information based on this sensitivity information and during online generation of the result set.

Data server 210 returns the result set and the result set sensitivity information to application 232. The result set sensitivity information may be returned within metadata accompanying the result set. Application 232 may then return the result set and/or other data generated based thereon (e.g., a data visualization) to the requesting client application. The foregoing example allows application 232 to protect the result set based on the result set sensitivity information. The requesting client application may, in some embodiments, also receive the result set sensitivity information and/or other any information that was generated based thereon.

Development system 250 may communicate with data server 210 during design-time to configure data server 210 and to add, modify or delete metadata of metadata 214. More specifically, development system 250 may execute a database design application to create or modify a data schema which logically represents the data sources of data stores 242, 244 and 246, and to specify properties of underlying database tables and attributes of table columns. These properties and attributes may include sensitivity information as described herein. Development system 250 may comprise any suitable computing system (e.g., desktop computer, laptop computer, tablet computer, smartphone).

FIG. 3 is an outward view of a user interface presented by a display device of development system 250 during execution of a database design application according to some embodiments. User interface 300 comprises a window including metadata table 310. Metadata table 310 specifies column names for a database table entitled Employees and several attributes for each column. A database developer operating development system 250 may modify table 310 to create or delete attributes and attribute values associated with particular columns of the Employees table. As mentioned above, embodiments are not limited to structured data sources.

According to the illustrated example, the column attributes include Data Type, Allow Nulls, Default, Info_type and Sensitivity. Embodiments are not limited to the attributes of FIG. 3. The Data Type attribute indicates the data type of a column and the Allow Nulls attribute indicates whether the column allows null values. The Default attribute specifies a default value to be used for a column whenever no value is specified for the column. Many other column attributes may be specified as is known in the art.

The Info_type and Sensitivity attributes provide sensitivity information of an associated column according to the present description. Example values of the Info_type attribute include Credit Card Number, Bank Account Number, Name, SSN, etc. Example values of the Sensitivity attribute may include PII (Personally Identifiable Information), HBI (High Business Impact), MBI (Medium Business Impact), LBI (Low Business Impact), Regulated, Confidential, Public, but are not limited thereto. Embodiments may employ any other suitable sensitivity-related attributes, and any number of sensitivity-related attributes per data source. For example, a sensitivity-related column attribute may specify access restrictions.

The sensitivity information may indicate a degree to which associated data should be protected from unauthorized access and/or disclosure. Various types of data may be associated with different sensitivity information, which may be usable to authorize access to the data and/or to determine an amount of harm which would occur if the data were disclosed.

According to some embodiments, database metadata may define table properties which provide sensitivity information for an entire database table, and/or database properties which provide sensitivity information for an entire database. This table-level and database-level sensitivity information could also be used to determine result set sensitivity information in addition or as alternatives to the sensitivity-related attributes associated with individual table column data source. An unstructured data source may similarly be associated with dedicated sensitivity information as well as database-level sensitivity information.

Figure 4:
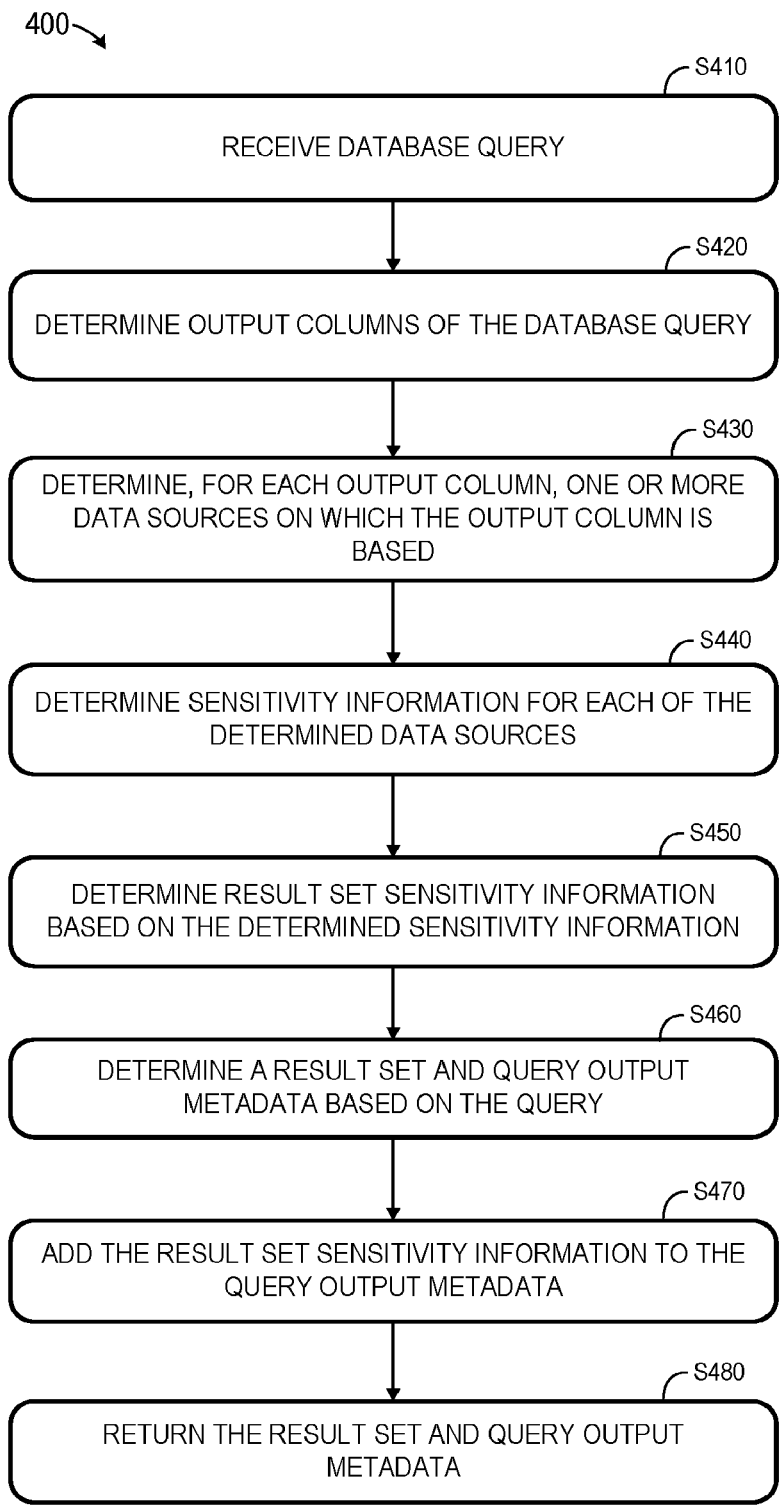
FIG. 4 is a flow diagram of a process to determine and provide result set sensitivity information according to some embodiments.

FIG. 4 comprises a flow diagram of process 400 to determine and provide result set sensitivity information according to some embodiments. In some embodiments, a processing unit (e.g., one or more processors, processing cores, processor threads) of a data server executes software program code to cause the data server to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a database query is received at S410. As described above, the database query may be received by a data server from a client system or an intermediate application server according to some embodiments. The database query may conform to any suitable query protocol. The query may be based on a database schema specified by database metadata, or may comprise a query of unstructured data sources.

Figures 5, 6, 7:
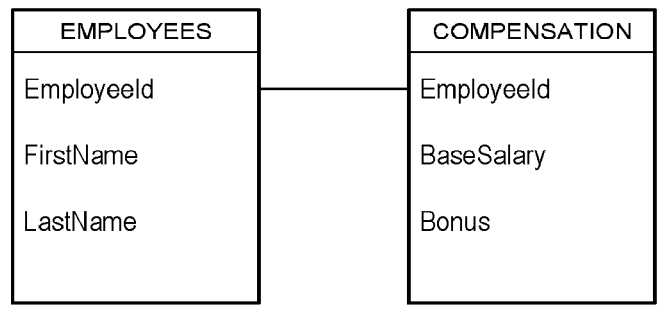
FIG. 5 is a graphical representation of a database schema according to some embodiments.
FIG. 6 is a tabular representation of a portion of a database table according to some embodiments.
FIG. 7 is a tabular representation of a portion of a database table according to some embodiments.

FIG. 5 is an example of a database schema according to one example. The FIG. 5 schema includes an Employees table and a Compensation table, each of which is also depicted in a tabular representation in FIG. 6 and FIG. 7, respectively. One or more of the columns of the Employees table and the Compensation table may be associated with sensitivity information defined by metadata. Specifically, one or more of the columns may be associated with values of one or more sensitivity-related attributes. With respect to FIG. 3, the FirstName and LastName columns of the Employees table may each be associated with the value "name" for the Info_type attribute and the value "PII" for the Sensitivity attribute.

At S420, output columns of the received database query are determined. The output columns are columns of a result set specified by the query. To provide an example, it will be assumed that the following query has been received at S410:

```
SELECT
    E.EmployeeId AS "Employee ID",
    E.FirstName + " " + E.LastName AS "Name",
    C.BaseSalary + C.Bonus AS "Total Compensation"
FROM
    Employees E,
    Compensation C
WERE E.EmployeeId = C.EmployeeId
```

The SELECT statement of the query specifies the output columns of the query. Particularly, the output columns are EmployeeId, Name, and TotalCompensation. One or more data sources are then determined for each output column at S430. The determined one or more data sources are the data sources which are used to generate the values of an output column. In the present example, the one or more data sources comprise one or more table columns.

Continuing the present example, it can be seen from the query that the output column EmployeeId is based on the EmployeeId column of the Employee table, and the Name output column is based three different strings, two of which come from the LastName and FirstName columns of the Employee table. The TotalCompensation output column is based on values from the BaseSalary and Bonus columns of the Compensation table.

According to some embodiments, S430 is implemented by tracing through a parse tree associated with the query. A parse tree reflects a query plan which is generated based on the query prior to query execution. Generally, a parse tree illustrates the flow of row sources from one step to another in a query execution plan. A parse tree corresponding to the above query is presented below:

```
SELECT
    JOIN
        GETTABLE
            Employees (E)
        GETTABLE
            Compensation (C)
    OUTPUTS
        IDENTIFIER
            E.EmployeeId
        CONCATENATE
            IDENTIFIER
                E.FirstName
            LITERAL String
                " "
            IDENTIFIER
                E.LastName
        ADD
            IDENTIFIER
                C.BaseSalary
            IDENTIFIER
                C.Bonus
```

As shown, the OUTPUTS section of the parse tree identifies the source table columns for each output column. A query parse tree may be used similarly to identify the data sources (e.g., table columns) of output columns which are generated based on multiple UNIONs, JOINs or the like.

Next, at S440, sensitivity information is determined for each of the data sources which was determined at S430. Continuing the above example, sensitivity information is determined at S440 for the FirstName column of the Employee table, the LastName column of the Employee table, the BaseSalary column of the Compensation table, and the Bonus column of the Compensation table. The sensitivity information may be determined from metadata 214, as described with respect to FIG. 3. For example, based on table 310, the sensitivity information Sensitivity: PII and Info_type: name may be determined for the FirstName column of the Employee table and for the LastName column of the Employee table.

According to some embodiments, the sensitivity information determined at S440 also or alternatively includes table-level sensitivity information. This table-level sensitivity information may also be defined in metadata 214 and may be associated with a table in which one or more of the determined columns reside. In some embodiments, the sensitivity information determined at S440 for a table column is equal to the sensitivity information associated with its table, unless the table column is associated with its own dedicated sensitivity information. In the latter case, the sensitivity information determined for the table column may be equal to its dedicated sensitivity information, or may be based on a combination of its dedicated sensitivity information and the sensitivity information of the table in which the column resides.

In some embodiments, the determined data sources belong to two or more different databases. The databases may be associated with different database-level sensitivity information, which may also be determined at S440.

Result set sensitivity information is determined at S450 based on the sensitivity information determined at S440. S450 may comprise any suitable system for determining the result set sensitivity information. Determination of the result set sensitivity information may be based on heuristics and/or pre-defined policies defining the conversion of the determined sensitivity information into result set sensitivity information.

In one example, the determined result set sensitivity information is simply a collection of all determined sensitivity information. Alternatively, the result set sensitivity information may be determined as a weighted (according to table column) or unweighted average of the determined sensitivity information. In yet another example, the result set sensitivity information is determined to be equal to the most-sensitive classification of the determined sensitivity information. In a case that the sensitivity information includes two or more types of information (e.g., Info_type and Sensitivity), the result set sensitivity information may be determined as the most-sensitive of each type of sensitivity information.

A result set is determined based on the query at S460 as is known in the art. According to some embodiments, data server 210 retrieves the result set from database tables stored in data storage system 240. The result set comprises a number of rows of values, where each row includes a value for each of the determined query output columns. Query output metadata describing the result set is also determined at S460, as is also known in the art. Such query output metadata may specify a number of rows of the result set, output column names, output column types, etc.

The result set sensitivity information is added to the query output metadata at S470. According to some embodiments of S470, database engine 212 includes the result set sensitivity information in a data structure which also includes the query output metadata. A network query protocol may be explicitly enriched to account for return of the result set sensitivity information. The result set and the query output metadata, which now includes the result set sensitivity information, are returned to the system from which the query was received at S410.

Database engine 212 generate audit logs to record access of sensitive data. Database engine 212 may use the audit logs for security monitoring, and/or to control transmission of sensitive data out of the data server 210.

Database engine 212 and/or application 232 may invoke security policies based on the result set sensitivity information and a user identity. The security policies may prevent transmission of the result set (or a portion thereof) to a requesting client system based on characteristics of the client system. In some embodiments, database engine 212 may determine the result set sensitivity information and control transmission of the result set to application 232 based thereon. Application 232 may also receive the result set sensitivity information and generate audit logs to record access of sensitive data, control transmission of sensitive data out of the system (e.g., to a client system 220, 222 or 224), or control copying of sensitive data (e.g., by a client system 220, 222 or 224).

The result set sensitivity information could be analyzed, perhaps in conjunction with other query output metadata, to detect unauthorized access. In one example, a large data extraction (e.g., evidenced by a large number of result set rows) of very sensitive data (i.e., evaluated based on returned result set sensitivity information) may indicate a data breach and cause database engine 212 or application 232 to issue corresponding log entries and/or alerts.

A client application may use the result set sensitivity information to process the returned result set in any number of manners. For example, a client application may display the result set based on the result set sensitivity information. A client application may also or alternatively control manipulation and subsequent export (e.g., printing, transmission to another device, data export) of the result set based on the result set sensitivity information.

FIG. 8 illustrates user interface 800 of a client application according to some embodiments. The client application is a data analysis application operable to request and view stored data. The data analysis application may comprise a spreadsheet application as is known in the art.

Table 810 presents a result set returned to the data analysis application in response to a query according to some embodiments. The result set includes four output columns and is associated with a result set sensitivity information which was also returned to the application as described above. According to the illustrated example, the application displays values of the result set and restricts the data based on the result set sensitivity information.

In particular, it is assumed that the result set sensitivity information associates the output column Birthdate with a particular sensitivity and associates the output column PassportNo with another, more-sensitive, sensitivity. Accordingly, and as specified by key 820, the values of the output column Birthdate are presented with underline formatting and are restricted from export to another application or system. The values of the PassportNo output column are presented with both underline and bold formatting, and are restricted from export and from copying. The values of the remaining two columns are not presented with additional formatting and no restrictions are placed on the use thereof.

FIG. 8 illustrates embodiments in which returned the result set sensitivity information is column-specific, at least in part. In some embodiments, the result set sensitivity information may be generic to all columns of the result set, in which case the client application may subject all the values of the result set to processing and/or display based on the same result set sensitivity information.

A client application may place any suitable protection mechanisms on received result set data based on result set sensitivity information, including but not limited to encryption, disabling forwarding, disabling sending, and disabling printing. Moreover, result set data may be formatted using any visual indications, including obscuring or hiding particular data, based on received result set sensitivity information.

A client application may provide various protection mechanisms which enforce pre-configured security policies. For example, a security policy may prohibit editing of data received from an unknown source. A client application may execute a protection mechanism to identify a source of received data, to determine whether the source of the data is known, and to disable editing of the data if the source is not known. Similar security policies may be configured based on result set sensitivity information as described herein. Accordingly, a client application may utilize such security policies to apply appropriate protection mechanisms to a result set based on result set sensitivity information. Various client systems or client applications may apply different protection mechanisms based on result sets associated with identical result set sensitivity information.

Figure 9:
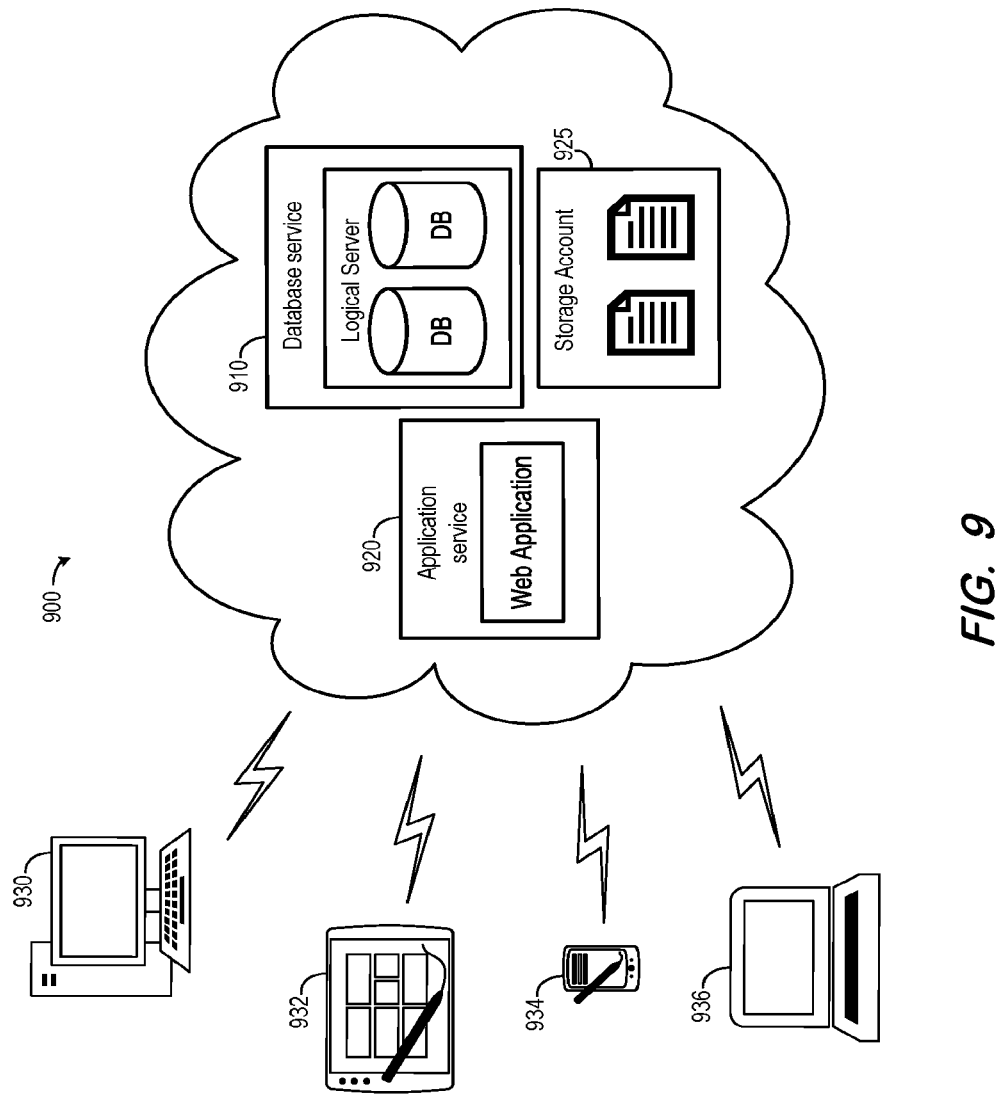
FIG. 9 is a block diagram of a cloud-based system architecture to provide result set sensitivity information according to some embodiments.

FIG. 9 is a block diagram of system architecture 900 according to some embodiments. Architecture 900 includes database service 910, application service 920 and storage account 925. Accordingly, architecture 900 may comprise a cloud-based implementation of some embodiments. Each of the elements of architecture 900 may comprise one or more computer servers executing one or more applications. Architecture 900 may be implemented using any number and type of public and/or private networks.

Database service 910 may comprise a relational database-as-a-service in the cloud. Database service 910 may host one or more databases within a logical server. Application service 920 may comprise a platform supporting the development and deployment of Web applications, and storage account 925 may comprise blob containers to store audit logs and/or other logs.

Any of client systems 930 through 936 may execute a Web browser to request data from a Web application deployed by application service 920. In response, application service 920 requests a result set from database service 910. Database service 910 generates a result set and result set sensitivity information as described herein and returns the result set and result set sensitivity information to the Web application. According to some embodiments, database service 910 returns the result set and the output column sensitivity information to the Web application, and the Web application determines the result set sensitivity information based on the output column sensitivity information. The result set and result set sensitivity information are then returned to the requesting client system.

Database service 910 and/or application service 920 may generate entries for an audit log of storage account 925. As described above, the audit log may record instances of data access, including the result set sensitivity information of any generated result set.

Figure 10:
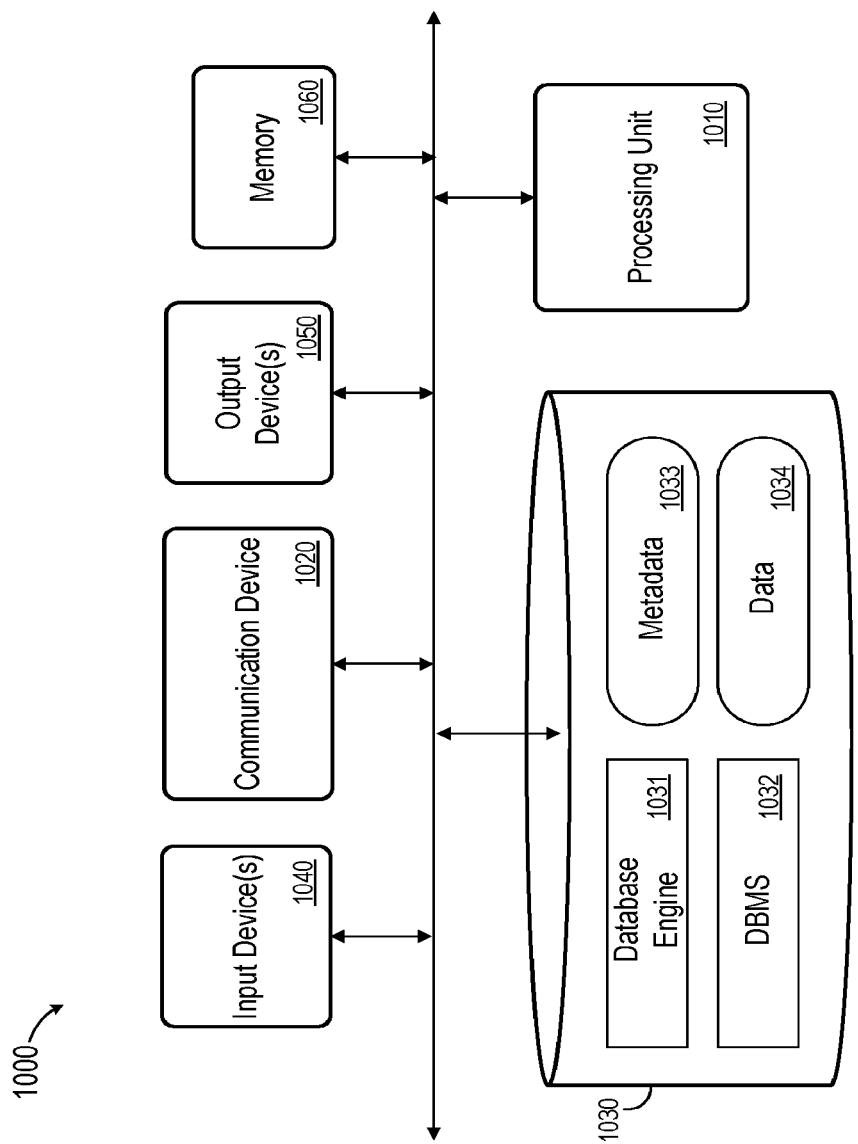
FIG. 10 is a block diagram of an apparatus to determine and provide result set sensitivity information according to some embodiments.

FIG. 10 is a block diagram of system 1000 according to some embodiments. System 1000 may comprise a general-purpose computer server and may execute program code to perform any of the functions described herein. System 1000 may include other unshown elements according to some embodiments.

System 1000 includes processing unit 1010 operatively coupled to communication device 1020, persistent data storage system 1030, one or more input devices 1040, one or more output devices 1050 and volatile memory 1060. Processing unit 1010 may comprise one or more processors, processing cores, etc. for executing program code. Communication device 1020 may facilitate communication with external devices, such as an external network in communication with the Web. Input device(s) 1040 may comprise, for example, a keyboard, a keypad, a mouse or other pointing device, a microphone, a touch screen, and/or an eye-tracking device. Output device(s) 1050 may comprise, for example, a display (e.g., a display screen), a speaker, and/or a printer.

Data storage system 1030 may comprise any number of appropriate persistent storage devices, including combinations of magnetic storage devices (e.g., magnetic tape, hard disk drives and flash memory), optical storage devices, Read Only Memory (ROM) devices, etc. Memory 1060 may comprise Random Access Memory (RAM), Storage Class Memory (SCM) or any other fast-access memory.

SQL Engine 1031 and database management system 1032 may comprise program code executed by processing unit 1010 to cause system 1000 to perform any one or more of the processes described herein. For example, execution of SQL engine 1031 may cause generation of a result set and of result set sensitivity information based on table metadata 1033 and data 1034. In this regard, table metadata 1033 and data 1034 may store metadata and data as described herein.

The data and metadata may be persisted in data storage system 1030 and/or loaded into memory 1060 during operation. Data storage device 1030 may also store data and other program code for providing additional functionality and/or which are necessary for operation of system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
a processor;
a memory device comprising program code structured to cause the processor to:
receive a database query from a database client;
determine output columns associated with a database query;
determine a plurality of data sources associated with the determined output columns;
determine, based on metadata associated with the determined data sources, an information type and a sensitivity level associated with each of the determined data sources;
determine a sensitivity of a result set based on the sensitivity levels associated with each of the determined data sources, wherein the sensitivity of the result set includes, for each determined information type, the most sensitive classification of the sensitivity levels for the information type;
acquire the result set based on the database query;
restrict export of the result set based on the result set sensitivity information; and
transmit the result set and the sensitivity of the result set to the database client.

2. The system of claim 1, wherein the program code is further structured to cause the processor to:
acquire result set metadata; and
add the sensitivity of the result set to the result set metadata,
wherein transmission of the sensitivity of the result set comprises transmission of the result set metadata to the database client.

3. The system of claim 1, wherein the metadata identifies an information type and a sensitivity level associated with one or more of the determined data sources.

4. The system of claim 1, wherein the program code is further structured to cause the processor:
update an audit log based on the result set and the result set sensitivity information.

5. The system of claim 1, wherein the determined data sources comprise table columns of one or more relational database tables.

6. The system of claim 5, wherein to determine a plurality of data sources, the program code is further structured to cause the processor to:
determine a parse tree based on the database query; and
determine the table columns based on the parse tree.

7. A computer-implemented method comprising:
receiving a database query from a database client;
determining result set output columns associated with a database query;
determining a plurality of data sources associated with the result set output columns;
determining, based on metadata associated with the determined data sources, a sensitivity level associated with each of the determined data sources;
determining a sensitivity level having the most sensitive classification of the sensitivity levels associated with the determined data sources as a sensitivity level of a result set;
determining the result set based on the database query;
updating an audit log based on the result set and the result set sensitivity information; and
transmitting the result set and the sensitivity level of the result set to the database client.

8. The computer-implemented method of claim 7, further comprising:
determining result set metadata describing the result set; and
adding the sensitivity level of the result set to the result set metadata,
wherein transmission of the sensitivity level of the result set comprises transmission of the result set metadata to the database client.

9. The computer-implemented method of claim 7, wherein the metadata identifies an information type and a sensitivity level associated with one or more of the determined data sources.

10. The computer-implemented method of claim 7, wherein the determined data sources comprise table columns of one or more relational database tables.

11. The computer-implemented method of claim 10, wherein determining the plurality of data sources comprises:
determining a parse tree based on the database query; and
determining the table columns based on the parse tree.

12. A computer-readable medium storing processor-executable code that, when executed by a processor, causes a processor to:
receive a database query from a database client;
determine result set output columns associated with the database query;
determine a plurality of data sources storing values on which the result set output columns are based;
determine, based on metadata associated with the determined data sources, a sensitivity level associated with each of the determined data sources;

determine a sensitivity level having the most sensitive classification of the sensitivity levels associated with the determined data sources as a sensitivity level of a result set;
determine the result set based on the database query;
restrict export of the result set based on the result set sensitivity information; and
transmit the result set and the sensitivity level of the result set to the database client.

13. The computer-readable medium of claim 12, wherein the code, when executed by the processor, further causes the processor to:
determine result set metadata describing the result set; and
add the sensitivity level of the result set to the result set metadata,
wherein transmission of the sensitivity level of the result set comprises transmission of the result set metadata to the database client.

14. The computer-readable medium of claim 12, wherein the metadata identifies an information type and a sensitivity level associated with one or more of the determined data sources.

15. The computer-readable medium of claim 12, wherein to determine the plurality of data sources, the code, when executed by the processor, further causes the processor to:
determine a parse tree based on the database query; and
determine the plurality of data sources based on the parse tree.

16. The computer-readable medium of claim 12, wherein the determined data sources comprise table columns of one or more relational database tables.

17. The computer-readable medium of claim 12, wherein the code, when executed by the processor, further causes the processor to:
update an audit log based on the result set and the result set sensitivity information.

18. The system of claim 1, wherein, to restrict export of the result set, the program code is structured to further cause the processor to perform at least one of:
restrict copying of the result set;
restrict printing of the result set;
restrict subsequent transmission of the result set by the database client; or
obscuring the result set.

19. The computer-implemented method of claim 7, further comprising:
restricting export of the result set based on the result set sensitivity information.

20. The computer-readable medium of claim 12, wherein, to restrict export of the result set, the processor-executable code, when executed by the processor, further causes the processor to perform at least one of:
restrict copying of the result set;
restrict printing of the result set;
restrict subsequent transmission of the result set by the database client; or
obscuring the result set.

* * * * *